United States Patent
Burnet et al.

(10) Patent No.: US 10,142,138 B2
(45) Date of Patent: Nov. 27, 2018

(54) APPARATUSES AND METHODS FOR OPTIMIZING USAGE OF A SINGLE INTERFERENCE CANCELLATION AND SUPPRESSION RECEIVER

(71) Applicant: MediaTek Singapore Pte. Ltd., Singapore (SG)

(72) Inventors: Craig Burnet, Hertfordshire (GB); Tze-Ping Low, Lexington, MA (US); Pei-Kai Liao, Nantou County (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/473,938

(22) Filed: Mar. 30, 2017

(65) Prior Publication Data
US 2017/0288919 A1    Oct. 5, 2017

Related U.S. Application Data

(60) Provisional application No. 62/316,610, filed on Apr. 1, 2016.

(51) Int. Cl.
*H04L 25/08* (2006.01)
*H04W 72/04* (2009.01)
*H04W 84/04* (2009.01)

(52) U.S. Cl.
CPC .......... *H04L 25/08* (2013.01); *H04W 72/042* (2013.01); *H04W 84/042* (2013.01)

(58) Field of Classification Search
CPC ............................ H04L 25/08; H04W 72/042
See application file for complete search history.

(56) References Cited

U.S. PATENT DOCUMENTS

| | | | |
|---|---|---|---|
| 2015/0312074 A1 | 10/2015 | Zhu et al. | |
| 2016/0309542 A1* | 10/2016 | Kowalski | H03M 13/2707 |
| 2017/0230135 A1* | 8/2017 | Oh | H04L 1/001 |
| 2017/0310417 A1* | 10/2017 | Jung | H04J 15/00 |

OTHER PUBLICATIONS

"3rd Generation Partnership Project; Technical Specification Group Radio Access Network; Study on Downlink Multiuser Superposition Transmission (MUST) for LTE (Release 13), 3GPP TR 36.859 V13.0.0;" Dec. 2015; pp. 14-17.
"Motivation for Enhanced Multiuser Transmissions and Network Assisted Interference Cancellation for LTE;" 3GPP TSG RAN Meeting #66, RP-141895; Dec. 2014; pp. 1-2.

* cited by examiner

*Primary Examiner* — Jaison Joseph
(74) *Attorney, Agent, or Firm* — McClure, Qualey & Rodack, LLP

(57) ABSTRACT

A mobile communication device including a wireless transceiver and a controller is provided. The wireless transceiver includes a single interference cancellation or suppression receiver and is configured to perform wireless transmission and reception to and from a cellular station. The controller is configured to receive signaling information of a Multi-User Superposition Transmission (MUST) operation from the cellular station via the wireless transceiver, determine whether to perform a Network-Assisted Interference Cancellation and Suppression (NAICS) operation or the MUST operation according to the signaling information, and not perform both the NAICS operation and the MUST operation simultaneously.

14 Claims, 5 Drawing Sheets

APPARATUSES AND METHODS FOR OPTIMIZING USAGE OF A SINGLE INTERFERENCE CANCELLATION AND SUPPRESSION RECEIVER

CROSS REFERENCE TO RELATED APPLICATIONS

This application claims priority of U.S. Provisional Application No. 62/316,610, filed on Apr. 1, 2016, the entirety of which is incorporated by reference herein.

BACKGROUND OF THE APPLICATION

Field of the Application

The application generally relates to interference cancellation/suppression techniques, and more particularly, to optimize usage of a single interference cancellation and suppression receiver for Network-Assisted Interference Cancellation and Suppression (NAICS) and Multi-User Superposition Transmission (MUST).

Description of the Related Art

The Long Term Evolution (LTE) technology is an improvement upon the Universal Mobile Telecommunication System (UMTS), providing a higher data rate, lower latency, and improved system capacity. With the rapid development of wireless technologies, there is a periodic increase in traffic density, and this increased density causes interference to User Equipment (UE), especially with UEs at the cell edge (which may be referred to as cell-edge UEs). In a standard LTE system without Coordinated Multi-Point (CoMP), there is no communication between neighboring evolved Node-Bs (eNBs) and the cell-edge UEs may suffer from inter-cell interference due to the lack of eNB coordination. An interference cancellation technique called Network-Assisted Interference Cancellation and Suppression (NAICS) is first introduced in release 12 of the 3rd Generation Partnership Project (3GPP) specifications for LTE, aiming to mitigate the inter-cell interference for UEs.

For release 13, the 3GPP is currently in the process of investigating another technique called Multi-User Superposition Transmission (MUST) which is used for two UEs (one is near the serving eNB while the other one is far from the serving eNB) to share the same beam with their data streams superimposed on top of each other. The near UE needs to detect and subtract the data stream of the far UE first before it can decode its own data stream, and this detection and subtraction process is similar to the interference mitigation process used in NAICS.

These two techniques address different interference scenarios where NAICS targets inter-cell interference and MUST targets multi-user interference within the same cell. Specifically, these two techniques target different operating scenarios within a cell where NAICS is more effective at cell edge and MUST is more effective in cell center. MUST differs from NAICS in that it would be dynamically scheduled whereas the NAICS receiver within a UE detects the strongest interference and then cancels/suppresses this interference. Thus, there are some obvious differences between these two schemes, and solutions to support both MAICS and MUST with a common receiver implementation are sought.

BRIEF SUMMARY OF THE APPLICATION

In a first aspect of the application, a mobile communication device comprising a wireless transceiver and a controller is provided. The wireless transceiver comprises a single interference cancellation or suppression receiver and is configured to perform wireless transmission and reception to and from a cellular station. The controller is configured to receive signaling information of a Multi-User Superposition Transmission (MUST) operation from the cellular station via the wireless transceiver, determine whether to perform a Network-Assisted Interference Cancellation and Suppression (NAICS) operation or the MUST operation according to the signaling information, and not perform both the NAICS operation and the MUST operation simultaneously.

In a second aspect of the application, a method for a mobile communication device to optimize usage of a single interference cancellation and suppression receiver therein is provided. The method comprises the steps of: receiving signaling information of a MUST operation from a cellular station; determining whether to perform a NAICS operation or the MUST operation according to the signaling information; and not performing both the NAICS operation and the MUST operation simultaneously.

In a third aspect of the application, a cellular station comprising a wireless transceiver and a controller is provided. The wireless transceiver is configured to perform wireless transmission and reception to and from a mobile communication device. The controller is configured to not schedule simultaneous operations of both a NAICS and a MUST in signaling information for the mobile communication device, and transmit the signaling information to the mobile communication device via the wireless transceiver.

In a fourth aspect of the application, a method for a cellular station to optimize usage of a single interference cancellation and suppression receiver in a mobile communication device is provided. The method comprises the steps of: not scheduling simultaneous operations of both a NAICS and a MUST in signaling information for a mobile communication device; and transmitting the signaling information to the mobile communication device.

In a fifth aspect of the application, a mobile communication device comprising a wireless transceiver and a controller is provided. The wireless transceiver comprises a single interference cancellation or suppression receiver and is configured to perform wireless transmission and reception to and from a cellular station. The controller is configured to receive first signaling information of a NAICS operation and second signaling information of a MUST operation from the cellular station via the wireless transceiver, and not perform the NAICS operation when the MUST operation is ongoing.

In a sixth aspect of the application, a method for a mobile communication device to optimize usage of a single interference cancellation and suppression receiver therein is provided. The method comprises the steps of: receiving first signaling information of a NAICS operation and second signaling information of a MUST operation from a cellular station; and not performing the NAICS operation when the MUST operation is ongoing.

Other aspects and features of the present application will become apparent to those with ordinarily skill in the art upon review of the following descriptions of specific embodiments of the mobile communication devices, cellular stations, and the methods for optimizing usage of a single interference cancellation and suppression receiver.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The 3GPP specifications are used to teach the spirit of the application, and the application is not limited thereto.

Figure 1:
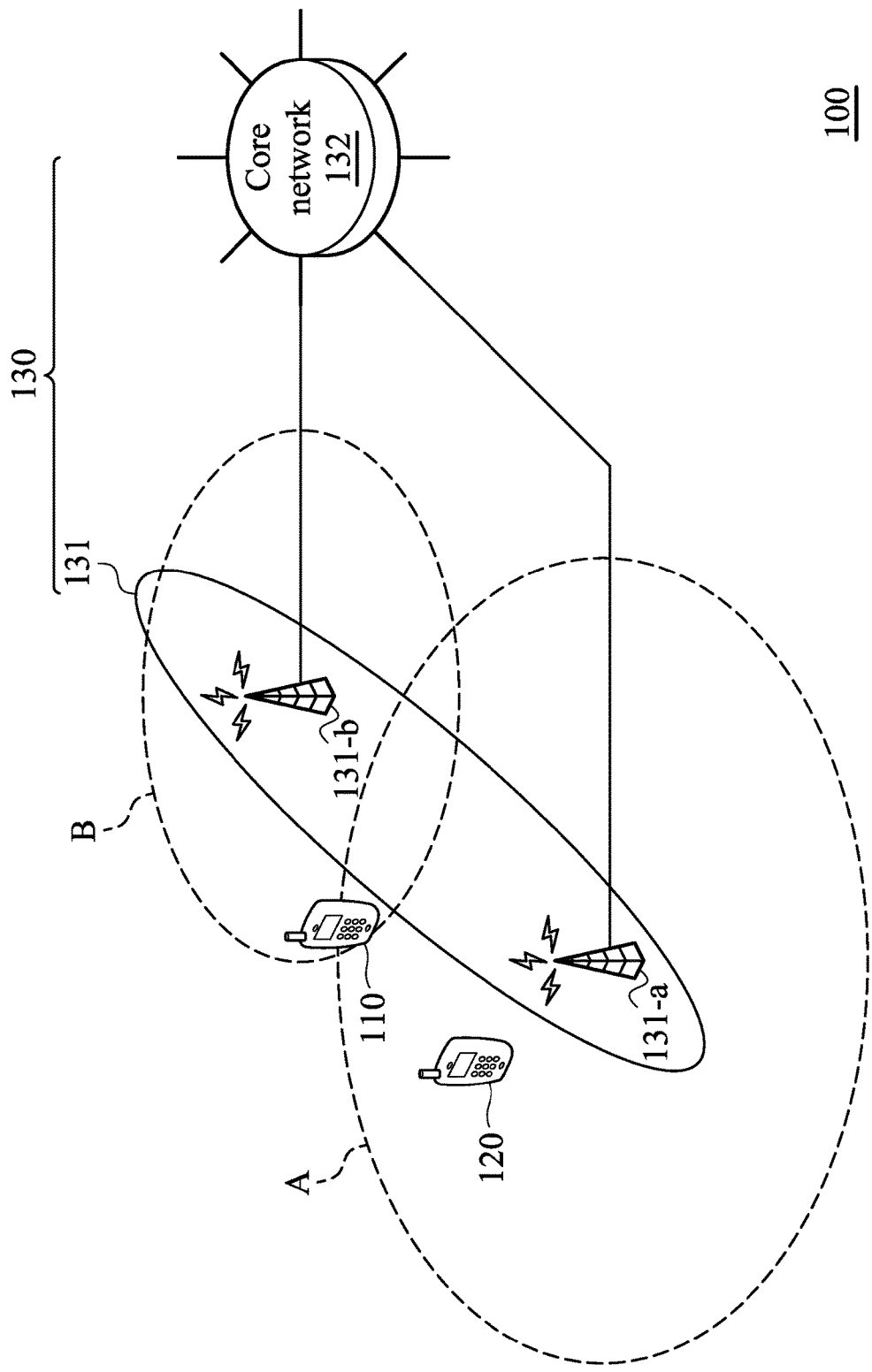
FIG. 1 is a block diagram of a wireless communication environment according to an embodiment of the application.

FIG. 1 is a block diagram of a wireless communication environment according to an embodiment of the application. The wireless communication environment 100 comprises two mobile communication devices 110 and 120, and a service network 130, wherein the mobile communication devices 110 and 120 are wirelessly connected to the service network 130 for obtaining mobile services. Each of the mobile communication devices 110 and 120 may be referred to as User Equipment (UE), such as a feature phone, a smartphone, a panel Personal Computer (PC), a laptop computer, or any computing device supporting the wireless technology utilized by the service network 130. The service network 130 may be an LTE/LTE-A/TD-LTE network.

Specifically, the service network 130 comprises an access network 131 and a core network 132, wherein the access network 131 is responsible for processing radio signals, terminating radio protocols, and connecting the mobile communication devices 110 and 120 with the core network 132, while the core network 132 is responsible for performing mobility management, network-side authentication, and interfaces with public/external networks (e.g., the Internet). Each of the access network 131 and the core network 132 may comprise one or more network nodes for carrying out said functions. For example, the access network 131 may be an Evolved-UTRAN (E-UTRAN) which includes at least two evolved NodeBs (eNBs) (e.g., macro eNB, femto eNB, or pico eNB), and the core network 132 may be an Evolved Packet Core (EPC) which includes a Home Subscriber Server (HSS), Mobility Management Entity (MME), Serving Gateway (S-GW), and Packet Data Network Gateway (PDN-GW or P-GW).

As shown in FIG. 1, there are two cells A and B in the area where the mobile communication device 110 is located. That is, the mobile communication device 110 is at the cell edge where the coverage of both cells overlaps, while the mobile communication device 120 is in a relatively cell-centered region where only the coverage of cell A is available. The access network 131 includes two eNBs 131-a and 131-b serving the two cells. An eNB may be a cellular station that communicates with UEs, e.g., the mobile communication devices 110 and 120, and may also be referred to as a base station, an access point, or the like. Each eNB may provide communication coverage for a particular geographic area. In 3GPP, the term "cell" can refer to this particular geographic coverage area of an eNB.

In one embodiment, the access network 131 may be a heterogeneous network that includes eNBs of different types, e.g., macro eNBs, pico eNBs, femto eNBs, relays, etc. A macro cell generally covers a relatively large geographic area (e.g., several kilometers in radius) and may allow unrestricted access by UEs with service subscriptions with the network provider. A pico cell generally covers a relatively small geographic area and may allow unrestricted access by UEs with service subscriptions with the network provider. A femtocell generally covers a relatively small geographic area in a residential-type setting (e.g., a home or small business) and, in addition to unrestricted access, may also provide restricted access by UEs having an association with the femtocell (e.g., UEs in a Closed Subscriber Group (CSG), UEs for users in the home, and the like).

Figure 2:
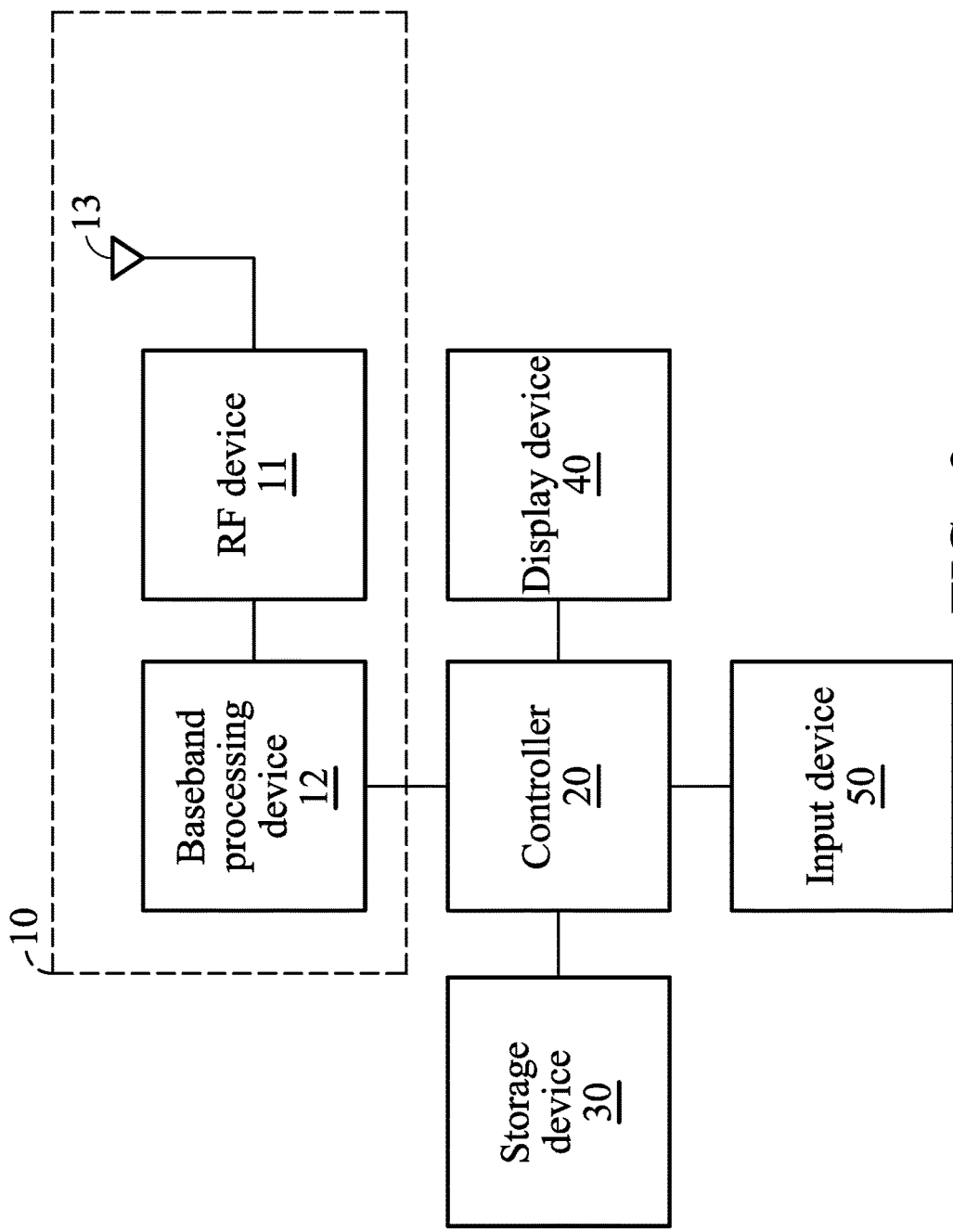
FIG. 2 is a block diagram illustrating a mobile communication device according to an embodiment of the application.

FIG. 2 is a block diagram illustrating a mobile communication device according to an embodiment of the application. A mobile communication device comprises a wireless transceiver 10, a controller 20, a storage device 30, a display device 40, and an input device 50. The wireless transceiver 10 is configured to perform wireless transmission and reception to and from the access network 131, and comprises a single interference cancellation and suppression receiver. Specifically, the wireless transceiver 10 comprises a Radio Frequency (RF) device 11, a baseband processing device 12, and an antenna 13. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may comprise a mixer to multiply the baseband signals with a carrier oscillated in the radio frequency of the supported wireless technologies, wherein the radio frequency may be 900 MHz, 2100 MHz, or 2.6 GHz utilized in LTE/LTE-A/TD-LTE technology, or another radio frequency, depending on the wireless technology in use.

The controller 20 may be a general-purpose processor, a Micro Control Unit (MCU), an application processor, a Digital Signal Processor (DSP), or the like, which includes various circuitry for providing the functions of data processing and computing, controlling the wireless transceiver 10 for wireless communications with the access network 131, storing and retrieving data to and from the storage device 30, sending a series of frame data (e.g. representing text messages, graphics, images, etc.) to the display device 40, and receiving signals from the input device 50. In particular, the controller 20 coordinates the aforementioned operations of the wireless transceiver 10, the storage device 30, the display device 40, and the input device 50 for performing the method of the present application.

In another embodiment, the controller 20 may be incorporated into the baseband processing device 12, to serve as a baseband processor.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method of the present application.

The display device 40 may be a Liquid-Crystal Display (LCD), Light-Emitting Diode (LED) display, or Electronic Paper Display (EPD), etc., for providing a display function. Alternatively, the display device 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

Figure 3:
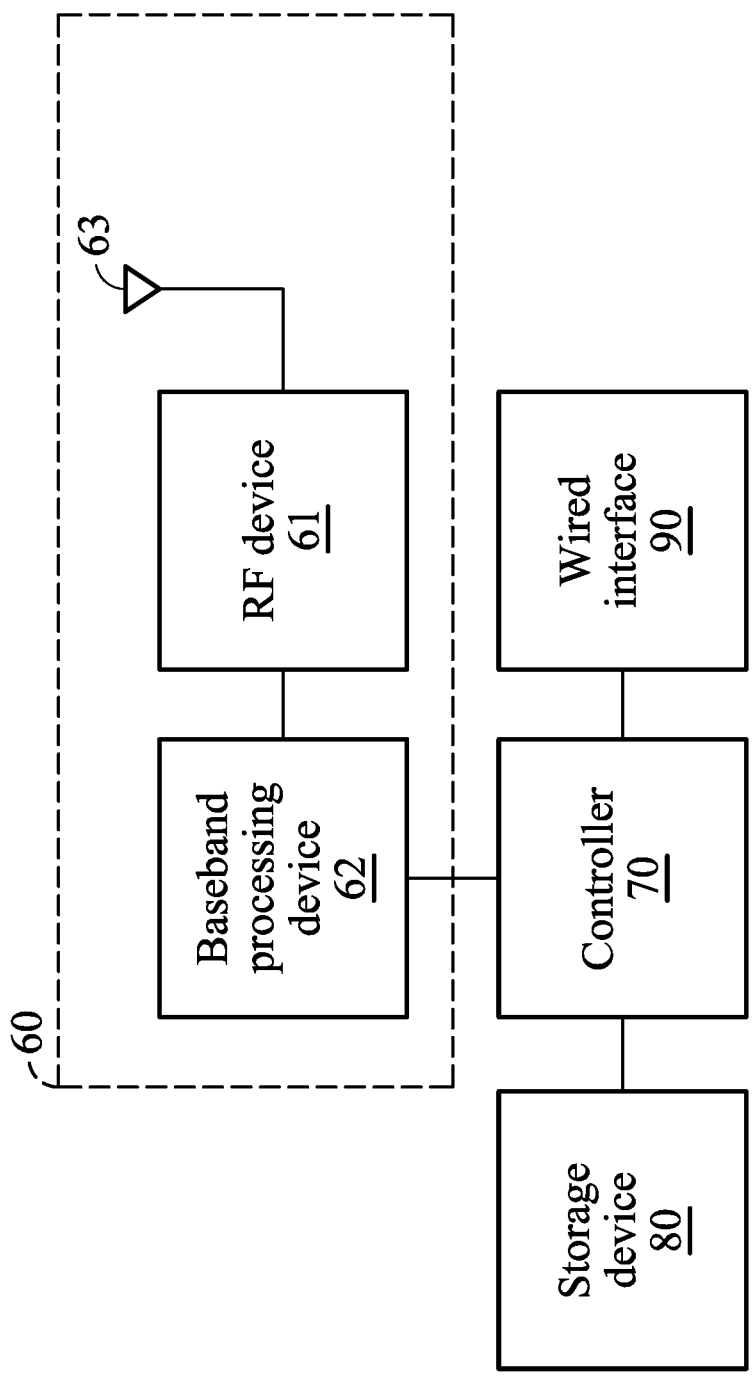
FIG. 3 is a block diagram illustrating a cellular station according to an embodiment of the application.

FIG. 3 is a block diagram illustrating a cellular station according to an embodiment of the application. The cellular station comprises a wireless transceiver 60, a controller 70, a storage device 80, and a wired interface 90. The wireless transceiver 60 is similar to the wireless transceiver 10 in FIG. 2, and thus, the detailed description is not repeated herein for brevity.

The controller 70 may be a general-purpose processor, an MCU, an application processor, a DSP, or the like, which includes various circuitry for providing the functions of data processing and computing, controlling the wireless transceiver 60 for wireless communications with the mobile communication devices 110 and 120, storing and retrieving data to and from the storage device 80, and sending/receiving messages to/from other network entities through the wired interface 90. In particular, the controller 70 coordinates the aforementioned operations of the wireless transceiver 60, the storage device 80, and the wired interface 90 to perform the method of the present application.

In another embodiment, the controller 70 may be incorporated into the baseband processing device 62, to serve as a baseband processor.

As will be appreciated by persons skilled in the art, the circuitry of the controller 20 or 70 will typically include transistors that are configured in such a way as to control the operation of the circuitry in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a memory, such as a FLASH memory or an NVRAM, or a magnetic storage device, such as a hard disk or a magnetic tape, or an optical disc, or any combination thereof for storing instructions and/or program code of applications, communication protocols, and/or the method of the present application.

The wired interface 90 is responsible for providing wired communications with other network entities, such as MMES and S-GWs, in the core network 132. The wired interface 90 may include a cable modem, an Asymmetric Digital Subscriber Line (ADSL) modem, a Fiber-Optic Modem (FOM), and/or an Ethernet network interface.

It should be understood that the components described in the embodiment of FIG. 3 are for illustrative purposes only and are not intended to limit the scope of the application. For example, the cellular station may further include other functional devices, such as a display device (e.g., LCD, LED display, or EPD, etc.), an I/O device (e.g., button, keyboard, mouse, touch pad, video camera, microphone, speaker, etc.), and a power supply, etc.

Figure 4:
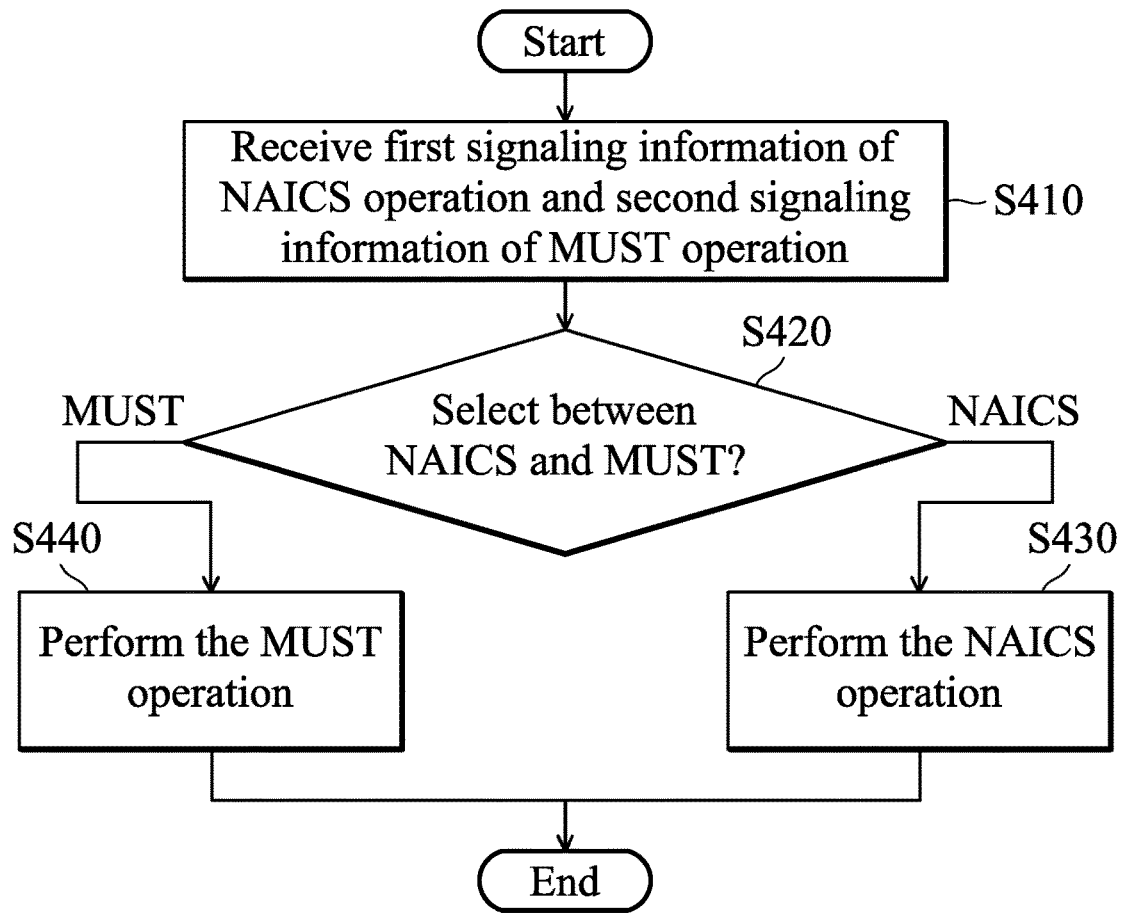
FIG. 4 is a flow chart illustrating the method for optimizing usage of a single interference cancellation and suppression receiver according to an embodiment of the application.

FIG. 4 is a flow chart illustrating the method for optimizing usage of a single interference cancellation and suppression receiver according to an embodiment of the application. In this embodiment, explicit signaling is used by employing specific information to indicate to the UE to perform either the NAICS operation or the MUST operation, and the method is applied to a UE, e.g., the mobile communication device 110 or 120. To begin, the UE receives first signaling information of a NAICS operation and second signaling information of a MUST operation from a cellular station (step S410). In one embodiment, the second signaling information is a Downlink Control Information (DCI) in a predetermined type of format dedicated for MUST, which comprises a bit indicating the NAICS operation or the MUST operation.

Next, the UE determines whether to perform the NAICS operation or the MUST operation according to the second signaling information (step S420).

If the second signaling information indicates the UE to perform the NAICS operation (e.g., the MUST DCI format contains a bit indicating the NAICS operation), then the UE performs the NAICS operation (step S430). Otherwise, if the second signaling information indicates the UE to perform the MUST operation (e.g., the MUST DCI format contains a bit indicating the MUST operation), then the UE performs the MUST operation (step S440). That is, according to the determination result, the UE does not perform both the NAICS operation and the MUST operation simultaneously. On the other hand, the cellular station does not schedule simultaneous operations of both NAICS and MUST in the second signaling information for the UE.

In one embodiment, the cellular station may determine whether the UE is at the cell edge, and if so, the cellular station does not schedule a MUST operation in the second signaling information, and schedule a MUST operation in the second signaling information if not. For example, for the mobile communication device 110 which is at the cell edge, the cellular station may not schedule MUST operation in the second signaling information to the mobile communication device 110; for the mobile communication device 120 which is at the cell-centered region, the cellular station may schedule a MUST operation in the second signaling information to the mobile communication device 120.

Figure 5:
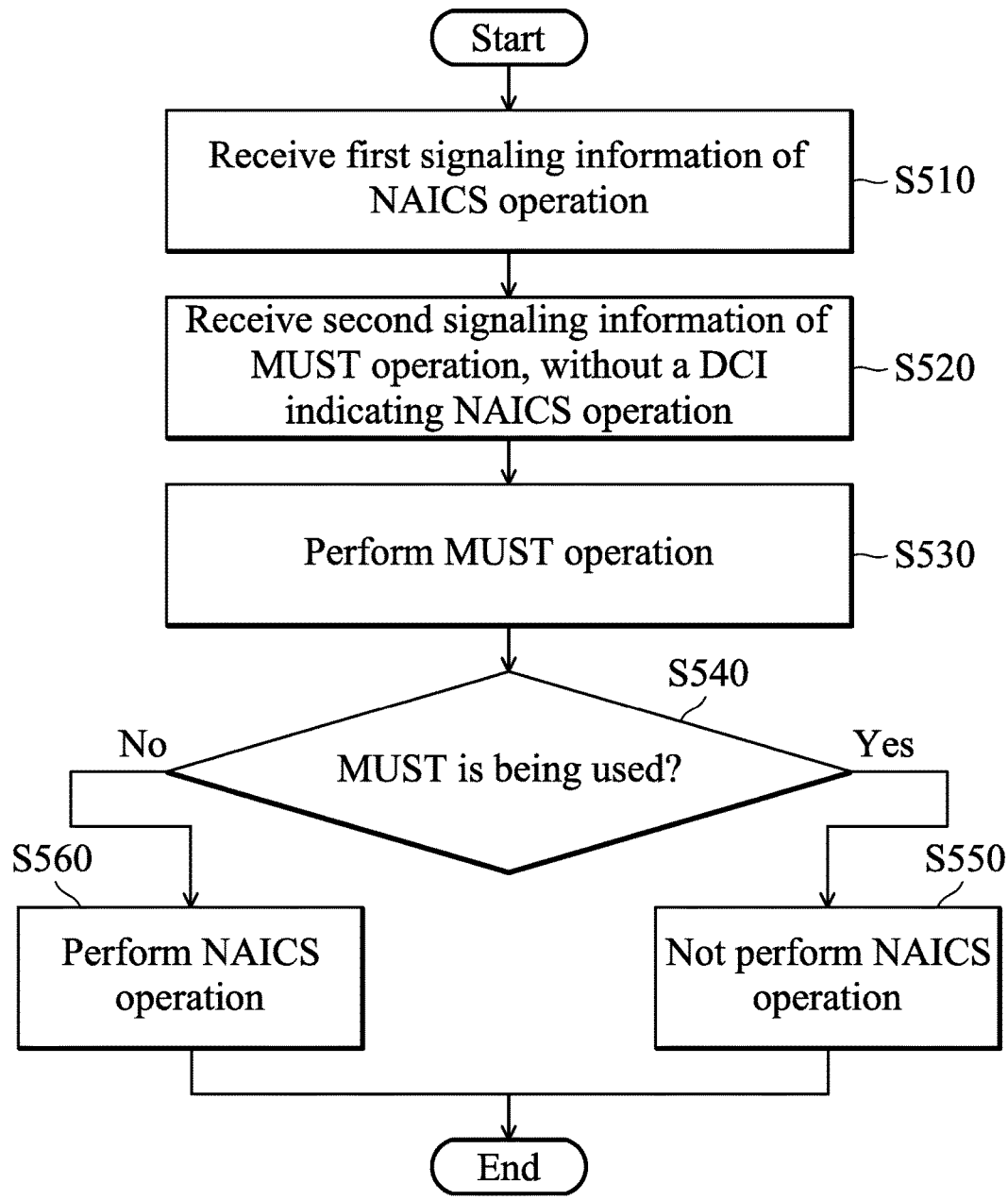
FIG. 5 is a flow chart illustrating the method for optimizing usage of a single interference cancellation and suppression receiver according to another embodiment of the application.

FIG. 5 is a flow chart illustrating the method for optimizing usage of a single interference cancellation and suppression receiver according to another embodiment of the application. In this embodiment, implicit signaling is used without employing specific information to indicate to the UE to perform either the NAICS operation or the MUST operation, and the method is applied to a UE, e.g., the mobile communication device 110 or 120. To begin, the UE receives first signaling information of a NAICS operation from a cellular station (step S510), and receives second signaling information of a MUST operation from the cellular station, wherein the second signaling information does not comprise a DCI indicating the NAICS operation (step S520).

In response to the second signaling information not comprising a DCI indicating the NAICS operation, the MUST operation is implied and the UE performs the MUST operation (step S530).

Next, the UE determines whether the MUST operation is ongoing, i.e., MUST is being used (step S540). If the MUST operation is ongoing, the UE does not perform the NAICS operation according to the first signaling information (step S550). Otherwise, if the MUST operation is not ongoing, the UE performs the NAICS operation according to the first signaling information (step S560). That is, there's no NAICS performance requirement for a UE that has signaled NAICS capability when MUST is being used.

In one embodiment, the NAICS signaling information may be sent in a semi-static fashion to all UEs in the same cell, and the UE performs the NAICS operation according to the NAICS signaling information unless MUST signaling information without a DCI indicating the NAICS operation is received.

In view of the forgoing embodiment of FIGS. 4 and 5, it will be appreciated that the present application realizes optimization of usage of a single interference cancellation and suppression receiver, by allowing the single receiver to be applied to both the NAICS and MUST operations. Advantageously, the complexity of receiver implementation is greatly reduced for supporting both NAICS and MUST.

While the application has been described by way of example and in terms of preferred embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A mobile communication device, comprising:
a wireless transceiver, comprising a single interference cancellation or suppression receiver, configured to perform wireless transmission and reception to and from a cellular station; and
a controller, configured to receive first signaling information of a Network-Assisted Interference Cancellation and Suppression (NAICS) operation from the cellular station via the wireless transceiver, receive second signaling information of a Multi-User Superposition Transmission (MUST) operation from the cellular station via the wireless transceiver, and allow the wireless transceiver to support both MUST and NAICS using the single interference cancellation or suppression receiver, by: using the second signaling information instead of the first signaling information to determine whether to perform the NAICS operation or the MUST operation, thereby avoiding performing both the NAICS operation and the MUST operation simultaneously.

2. The mobile communication device of claim 1, wherein the second signaling information is a Downlink Control Information (DCI) in a predetermined type of format, which comprises a bit indicating the NAICS operation or the MUST operation.

3. A method for a mobile communication device to optimize usage of a single interference cancellation and suppression receiver therein, the method comprising:

receiving first signaling information of a Network-Assisted Interference Cancellation and Suppression (NAICS) operation from a cellular station;
receiving second signaling information of a Multi-User Superposition Transmission (MUST) operation from the cellular station; and
allowing the mobile communication device to support both MUST and NAICS using the single interference cancellation or suppression receiver, by: using the second signaling information instead of the first signaling information to determine whether to perform the NAICS operation or the MUST operation at a time, thereby avoiding performing both the NAICS operation and the MUST operation simultaneously.

4. The method of claim 3, wherein the second signaling information is a Downlink Control Information (DCI) in a predetermined type of format, which comprises a bit indicating the NAICS operation or the MUST operation.

5. A cellular station, comprising:
a wireless transceiver, configured to perform wireless transmission and reception to and from a mobile communication device comprising a single interference cancellation or suppression receiver; and
a controller, configured to transmit first signaling information of a NAICS operation to the mobile communication device via the wireless transceiver, and not schedule simultaneous operations of both NAICS and MUST for the mobile communication device, by transmitting second signaling information of a MUST operation, which indicates the NAICS operation or the MUST operation, to the mobile communication device via the wireless transceiver.

6. The cellular station of claim 5, wherein the controller is further configured to determine whether the mobile communication device is at a cell edge, and the step of not scheduling simultaneous operations of both NAICS and MUST for the mobile communication device comprises:
scheduling the MUST operation for the mobile communication device when the mobile communication device is not at the cell edge; and
not scheduling the MUST operation for the mobile communication device when the mobile communication device is at the cell edge.

7. The cellular station of claim 5, wherein the second signaling information is a Downlink Control Information (DCI) in a predetermined type of format, which comprises a bit indicating the NAICS operation or the MUST operation.

8. A method for a cellular station to optimize usage of a single interference cancellation and suppression receiver in a mobile communication device, the method comprising:
transmitting first signaling information of a NAICS operation to the mobile communication device comprising a single interference cancellation and suppression receiver; and
not scheduling simultaneous operations of both NAICS and MUST for the mobile communication device, by transmitting second signaling information of a MUST operation, which indicates the NAICS operation or the MUST operation, to the mobile communication device.

9. The method of claim 8, further comprising determining whether the mobile communication device is at a cell edge, wherein the step of not scheduling simultaneous operations of both NAICS and MUST for the mobile communication device comprises:

scheduling the MUST operation for the mobile communication device when the mobile communication device is not at the cell edge; and not scheduling the MUST operation for the mobile communication device when the mobile communication device is at the cell edge.

10. The method of claim 8, wherein the second signaling information is a Downlink Control Information (DCI) in a predetermined type of format, which comprises a bit indicating the NAICS operation or the MUST operation.

11. A mobile communication device, comprising:
a wireless transceiver, comprising a single interference cancellation or suppression receiver, configured to perform wireless transmission and reception to and from a cellular station; and
a controller, configured to receive first signaling information of a Network-Assisted Interference Cancellation and Suppression (NAICS) operation from the cellular station via the wireless transceiver, receive second signaling information of a Multi-User Superposition Transmission (MUST) operation, which does not indicate the NAICS operation, from the cellular station via the wireless transceiver, and allow the wireless transceiver to support both MUST and NAICS using the single interference cancellation or suppression receiver, by: performing the NAICS operation only when the MUST operation is not ongoing, in response to the second signaling information not indicating the NAICS operation.

12. The mobile communication device of claim 11, wherein the controller is further configured to determine whether the second signaling information comprises a Downlink Control Information (DCI) for indicating the NAICS operation, and perform the MUST operation prior to the NAICS operation, when the second signaling information does not comprise the DCI.

13. A method for a mobile communication device to optimize usage of a single interference cancellation and suppression receiver therein, the method comprising:
receiving first signaling information of a Network-Assisted Interference Cancellation and Suppression (NAICS) operation from a cellular station;
receiving second signaling information of a Multi-User Superposition Transmission (MUST) operation from the cellular station; and
allowing the mobile communication device to support both MUST and NAICS using the single interference cancellation or suppression receiver, by: performing the NAICS operation only when the MUST operation is not ongoing, in response to the second signaling information not indicating the NAICS operation.

14. The method of claim 13, further comprising:
determining whether the second signaling information comprises a Downlink Control Information (DCI) for indicating the NAICS operation; and
performing the MUST operation prior to the NAICS operation, when the second signaling information does not comprise the DCI.

* * * * *